(No Model.)

C. E. PETTERSON.
HOSE COUPLING.

No. 475,704. Patented May 24, 1892.

WITNESSES:
Chas. H. Luther Jr
Henry J. Miller

INVENTOR:
Charles E. Petterson
By Joseph A. Miller & Co.
Attys

UNITED STATES PATENT OFFICE.

CHARLES E. PETTERSON, OF PROVIDENCE, RHODE ISLAND, ASSIGNOR TO HIMSELF AND HENRY E. AUDETTE, OF SAME PLACE.

HOSE-COUPLING.

SPECIFICATION forming part of Letters Patent No. 475,704, dated May 24, 1892.

Application filed December 16, 1891. Serial No. 415,259. (No model.)

*To all whom it may concern:*

Be it known that I, CHARLES E. PETTERSON, of the city of Providence, in the county of Providence and State of Rhode Island, have invented certain new and useful Improvements in Hose-Couplings; and I hereby declare that the following is a full, clear, and exact description of the same, reference being had to the accompanying drawings, forming part of this specification.

This invention has reference to improvements in devices by which the ends of hose may be coupled together or by aid of which hose may be repaired.

The object of this invention is to produce a hose-coupler which shall be more durable in construction and simple and efficient in its operation.

The invention consists in the peculiar construction of the interior sleeve and in the novel combination therewith of a clamping-coupler adapted to draw the ends of the hose together on said interior sleeve and to clamp said ends in position, as will be more fully described hereinafter, and pointed out in the claim.

Figure 1:
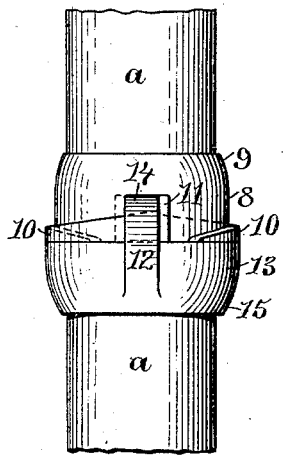
Figure 2:
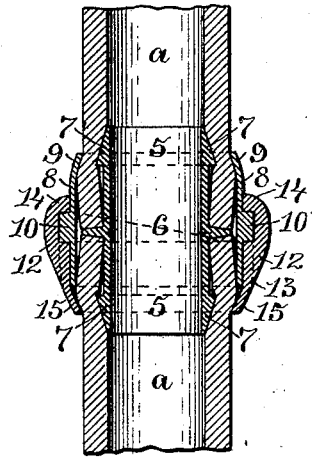

Figure 1 represents a view of two pieces of hose secured together by my improved coupler. Fig. 2 represents a vertical sectional view of the same to more clearly illustrate the construction of the coupler.

Similar numbers of reference designate corresponding parts throughout.

In the drawings, 5 indicates the interior sleeve, which has a central circumferential flange 6 and the circular shoulders 7 7, from which the metal of the sleeve is tapered down to thin edges. This sleeve is formed of a proper size to closely fit the interior of the hose to be coupled or repaired, the ends of which are passed over the sleeve in opposite directions until they come in contact with the central flange 6.

The coupler-collar 8 has the inwardly-bent edge 9 and is adapted to fit closely over the outer circumference of the hose, covering the junction of the ends of the same. Near the center of its length this collar 8 has the cam-flanges 10 10, each of which extends nearly one-half around the circumference of the collar and has the stop 11 at its broadest portion, sufficient space being left between the stop 11 of the flange and the narrow end of the other to admit the passage of the arms 12 12, formed in part with the clamping-collar 13, and having the shoulders or hooks 14 14, which engage with the cam-flanges 10 10. This clamping-collar 13 has also the inwardly-bent edge 15, considerably contracting the inner circumference of the same at this point.

In coupling two pieces of hose together the coupler-collar 8 is first placed over one piece of the hose A and pushed along for a short distance. The clamping-collar 13 is then pushed down over the other piece of hose and the interior sleeve is inserted in the ends of the two pieces of hose, which are butted against the central flange 6. The coupler-collar is then brought down in place, covering the ends of the hose, and the clamping-collar is pushed forward until the shoulders 14 of the arms 12 are in position to engage the thin ends of the cam-flanges. The coupler-collar is now held stationary, while the clamping-collar is revolved. As the shoulders 14 14 move over the cam-flanges 10 10 the two collars will be drawn tightly together, forcing the ends of the hose tightly on the sleeve 5 and securing them in place.

Having thus described my invention, I claim as new and desire to secure by Letters Patent—

The combination, with the interior sleeve 5, having the central flange 6 and the shoulders 7 7, of the coupler-collar 8, having the contracted edge 9 and the cam-flanges 10 10, provided with stops 11 11, and the clamping-collar 13, having the contracted portion 15, arms 12, provided with shoulders 14 14, adapted to engage said cam-flanges, as and for the purpose described.

CHARLES E. PETTERSON.

Witnesses:
J. A. MILLER, Jr.,
M. F. BLIGH.